(12) United States Patent
Mansfield

(10) Patent No.: US 12,214,816 B2
(45) Date of Patent: Feb. 4, 2025

(54) SYSTEM AND METHOD FOR BUILDING AND MANAGING A TRAIN CONSIST USING A PHASE ARRAY POWERED WIRELESS GATEWAY

(71) Applicant: Amsted Rail Company, Inc., Chicago, IL (US)

(72) Inventor: Edward J. Mansfield, Blue Bell, PA (US)

(73) Assignee: Amsted Rail Company, Inc., Chicago, IL (US)

( * ) Notice: Subject to any disclaimer, the term of this patent is extended or adjusted under 35 U.S.C. 154(b) by 33 days.

(21) Appl. No.: 18/183,547

(22) Filed: Mar. 14, 2023

(65) Prior Publication Data
US 2023/0278607 A1    Sep. 7, 2023

Related U.S. Application Data

(63) Continuation of application No. 16/513,916, filed on Jul. 17, 2019, now Pat. No. 11,628,870.
(Continued)

(51) Int. Cl.
*B61L 25/02*    (2006.01)
*B61L 15/00*    (2006.01)
(Continued)

(52) U.S. Cl.
CPC ......... *B61L 25/025* (2013.01); *B61L 15/0018* (2013.01); *B61L 15/0027* (2013.01);
(Continued)

(58) Field of Classification Search
CPC .............................. B61L 23/34; B61L 25/025
See application file for complete search history.

(56) References Cited

U.S. PATENT DOCUMENTS 7,082,171 B1    7/2006    Johnson et al.
7,705,743 B2    4/2010    Barone et al.
(Continued)

FOREIGN PATENT DOCUMENTS

| JP | S62123382 | 6/1987 |
| WO | 2016/191711 | 12/2016 |

OTHER PUBLICATIONS

Extended European Search Report for European Patent Application No. 19837143.7 dated Mar. 14, 2022 (14 pages).
(Continued)

*Primary Examiner* — Jess Whittington
(74) *Attorney, Agent, or Firm* — Fox Rothschild LLP; Carol E. Thorstad-Forsyth

(57) ABSTRACT

Railyard management system for managing, assembling, disassembling and validating train consists and monitoring railcars in the railyard. The system provides for the collection of data and the movement of data from lower processing levels to higher processing levels, where an inference engine draws inferences regarding the current state of railcars and train consists within the railyard. The inferences can be based on characteristics of a transmission signal received at their respective railcars, said railcars forming a train consist. The system can be used to track the location and orientation of railcars in the railyard and to validate order and orientation of assets in a train consist based on the characteristics of the transmission signal at said railcars.

14 Claims, 13 Drawing Sheets

Related U.S. Application Data

(60) Provisional application No. 62/699,368, filed on Jul. 17, 2018.

(51) Int. Cl.
  *G01S 3/04* (2006.01)
  *G01S 19/13* (2010.01)
  *H01Q 1/24* (2006.01)
  *H01Q 1/32* (2006.01)

(52) U.S. Cl.
  CPC ......... *B61L 15/0081* (2013.01); *B61L 25/028* (2013.01); *G01S 3/043* (2013.01); *G01S 19/13* (2013.01); *H01Q 1/241* (2013.01); *H01Q 1/3216* (2013.01); *B61L 2205/04* (2013.01)

(56) References Cited

U.S. PATENT DOCUMENTS

| | | | |
|---|---|---|---|
| 9,026,281 | B2 | 5/2015 | Murphy et al. |
| 2002/0103013 | A1 | 8/2002 | Watson et al. |
| 2004/0147220 | A1 | 7/2004 | Vaddiparty et al. |
| 2015/0232079 | A1 | 8/2015 | Martin et al. |
| 2016/0105218 | A1 | 4/2016 | Henry et al. |
| 2016/0272228 | A1* | 9/2016 | LeFebvre ................ H04L 67/12 |
| 2016/0325766 | A1* | 11/2016 | Tsujita ................ B61L 15/0027 |
| 2016/0325767 | A1 | 11/2016 | LeFebvre et al. |
| 2017/0054482 | A1* | 2/2017 | Forenza ............... H04B 7/0626 |
| 2018/0273063 | A1* | 9/2018 | Tsujita ..................... G01S 3/14 |
| 2019/0072661 | A1* | 3/2019 | Jeon ...................... H04W 88/02 |
| 2019/0182627 | A1* | 6/2019 | Thoresen ............... H04L 63/045 |

OTHER PUBLICATIONS

International Search Report and Written Opinion mailed Oct. 4, 2019 for International PCT Patent Application No. PCT/US2019/042185 (14 pages).

\* cited by examiner

SYSTEM AND METHOD FOR BUILDING AND MANAGING A TRAIN CONSIST USING A PHASE ARRAY POWERED WIRELESS GATEWAY

CROSS REFERENCE TO RELATED APPLICATIONS

The present application is a continuation of U.S. patent application Ser. No. 16/513,916 filed Jul. 17, 2019, which claims the benefit of U.S. Provisional Application Ser. No. 62/699,368 filed on Jul. 17, 2018, the contents of which are hereby incorporated by reference in their entirety.

BACKGROUND OF THE INVENTION

It has become increasingly important for railway owners and operators to be able to locate and organize assets, including railcars, locomotives and train consists on a real time basis. From an operational point of view, it is important for railway operators to determine whether a railcar is located within or outside the boundaries of a railyard, is moving or stationary, and whether or not the railcar is part of a train consist or not linked to other railcars.

Knowing the status of railcars allows an operator to determine if railcars are being utilized or idle at any given point in time and provides means to help in the management of railyard operations.

As current industry practice, the management of train consists and railyards in railroad operations relies on reading, at fixed points in the rail network, passive radio frequency identification ("RFID") tags which are affixed to each railcar. While this method provides railroad operators with check-in/check-out list of assets, it is not capable of transmitting timely information, such as location, status, condition, and/or performance data when not in range of an RFID reader. Additionally, the information typically encoded into an RFID tag is static and therefore, the RFID tag is not capable of providing the current status of the railcar. Further, currently systems do not provide a mechanism to validate a train consist before it leaves the railyard. Mistakes are possible when a train consist is created, and the result of such mistakes can be missing, incorrect or extra railcars in the train consist. There is also a safety risk that can be associated with using human intervention to visually validate a train consist before it departs a railyard.

Train/Rail communication and sensor systems are disclosed in U.S. Pat. No. 7,688,218 issued Mar. 30, 2010; U.S. Pat. No. 7,698,962 issued Apr. 20, 2010; U.S. Pat. No. 9,026,281 issued May 5, 2015; U.S. Pat. No. 9,365,223 issued Jun. 14, 2016; U.S. Pat. No. 10,137,915 issued Nov. 27, 2018, U.S. Pat. No. 10,259,477 issued Apr. 16, 2019; and U.S. patent application publication 2018/0319414, published Nov. 8, 2018, the full disclosures of all of these are incorporated herein by reference.

SUMMARY OF THE INVENTION

This disclosure proposes a system and method to enable a phased array powered wireless gateway ("PWG") to determine and validate the order of individual railcars in multiple linear train consists before leaving the railyard. The scientific principles involve measured vector information of the incident receive signals from the communications management device ("CMU") on each railcar by the phased array PWG. The phased array PWG uses a phased array antenna for the receive signals, a bank of phase shifters to separate magnitude and phase information from received signals and software to calculate spatial information from the extracted vector data. The same phased array PWG can be used to determine the railcar order for multiple train consists in a designated railyard. The proposed embodiments do not involve any measurements from on-board CMU or wireless sensor node ("WSN") sensors, on-board software enhancement, coordination by the locomotive-based PWG or any modifications to the intra-train communication system.

This disclosure proposes the implementation of angle-of-arrival (AoA) technology in the phased array PWG receiver to detect the direction of propagation of electromagnetic radiation from railcar CMU devices upon arrival at a phased array PWG receiver to determine railcar train consist ordering. The same AoA technology will be able to be used to manage railcar order across a fleet of train consists in a designated railyard.

The AoA signal collection technique may be a measurement method for determining the direction of propagation of a radio-frequency wave incident on an antenna array. The phased array PWG AoA method measures the Time Difference of Arrival ("TDOA") as well as the magnitude and phase information of signals received from separate CMUs at individual elements of the antenna array. An AoA calculation is made to determine the receive angle of the incident wave and the direction and location of the CMU.

DEFINITIONS

Figure 1:
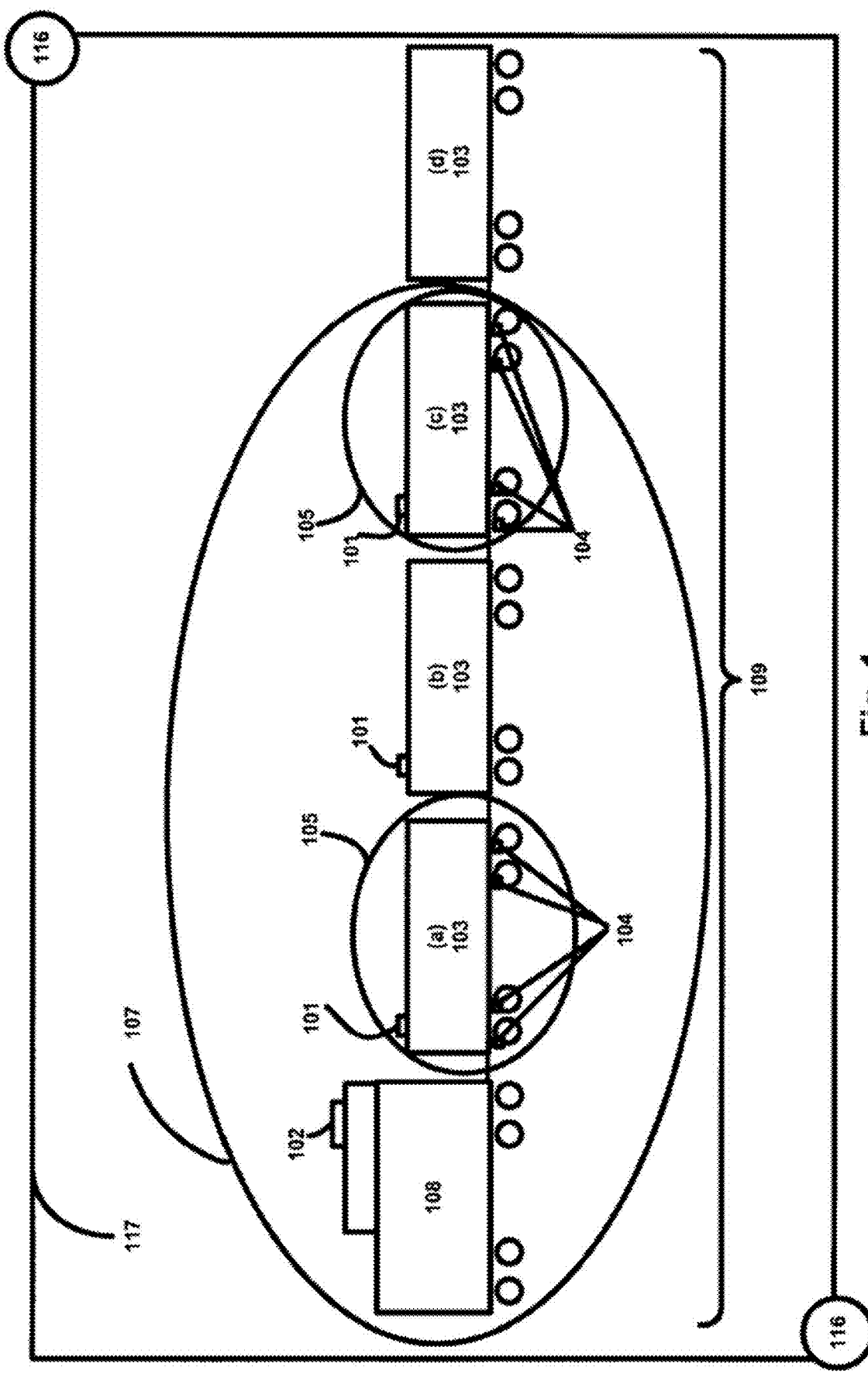
FIG. 1 is a diagram illustrating a train consist monitoring system and related hardware components.

A "train consist", shown in the drawings, for example FIG. 1, as reference number 109, is defined as a connected group of railcars and locomotives.

Figure 4:
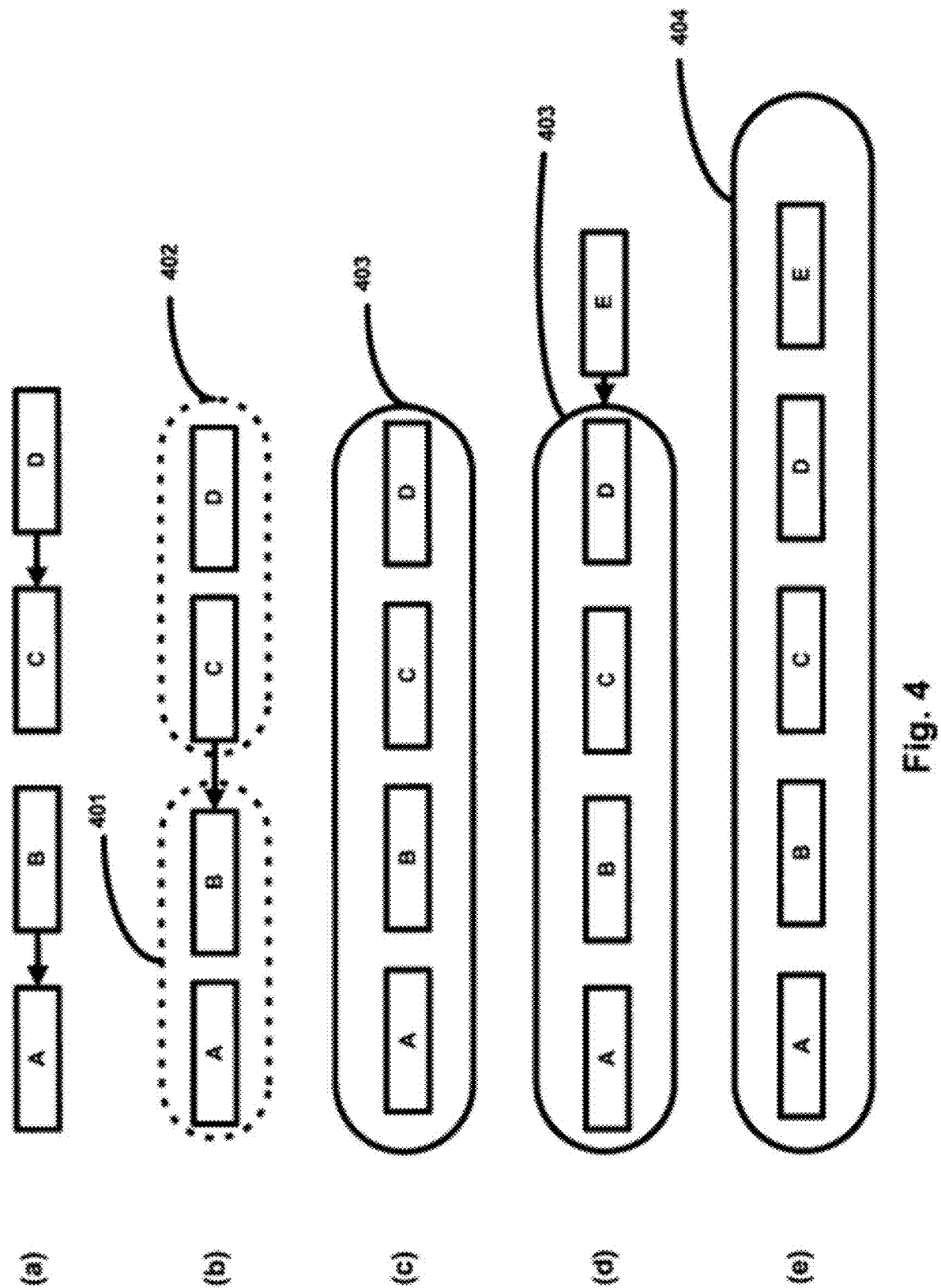
FIG. 4 is a diagram illustrating how railcars can be linked so that a train consist can be formed.

A "link", shown for example in FIG. 4, is defined as two or more railcars coupled together.

A "computing device" is defined as any machine capable of processing and executing software to perform calculations or otherwise provide functionality. The computing device shall also have data storage and network communication capabilities to perform the functions required by this invention. A computing device includes, but is not limited to, a server, PC, or powered wireless gateway manager ("PWG") 102, communications management unit ("CMU") as described in this document.

A "manager" is defined as any device that is capable of linking together nodes in a network on a time synchronized schedule and maintaining that link schedule such that reliable bi-directional communication is possible between all nodes in the network and with the manager. The manager may also provide a user interface to another network host for front end communication. A manager includes, but is not limited to, a PWG 102 or CMU 101, as described in this document.

A "node" is defined as any device that is capable of bi-directional wireless communications with another device to transmit and receive data. A node includes, but is not limited to, a CMU 101 or WSN 104, as described in this document A "sensor" is defined as any device that detects or measures a physical property and records the result, or transmits a resulting signal. One or more sensors may be present on a PWG 102, CMU 101, WSN 104, or railcar as described in this document A "wireless sensor node" ("WSN"), shown in the drawings, for example FIG. 1, as reference number 104, is typically located on a railcar 103(*a*) or 103(*b*), is deployed preferably in a self-contained, protective housing, and may include one or more sensors, a power source, circuitry to read the sensor(s) and convert the readings to a digital form, and communication circuitry which allows the WSN to wirelessly transmit the sensor readings to an external receiver. The wireless sensor nodes are used for sensing a parameter to be monitored (e.g. temperature of, for example, bearings or ambient air) or status (e.g., position of a hatch or hand brake). The WSN may also include an intelligence capability, implemented as software running on an embedded microprocessor to analyze the data and determine if the data needs to be transmitted immediately, held for later transmission, or aggregated into an alert. WSNs are typically a member of a wireless network, for example a mesh network, managed by either a CMU or a PWG. A WSN may communicate directly off-railcar with a locomotive, a remote server or a remote railroad operations center.

A "communications management unit" ("CMU"), shown in the drawings, for example FIG. 1, as reference number 101, is typically located on a railcar 103 and optionally acts as a manager for the railcar-based wireless network 105 overlaid on the railcar. A railcar-based wireless network could be, for example, a railcar-based wireless mesh network. The CMU hardware preferably includes a processor, a power source, for example, a battery, a global navigation satellite system ("GNSS") receiver, for example, global positioning system ("GPS") receiver, a communication device such as, for example, a satellite and or cellular communication system, local wireless transceiver (e.g Wi-Fi) a wireless communications capability for maintaining the network, and, optionally, one or more integrated sensors, such as, but not limited to, an accelerometer or temperature sensor. The CMU may support one or more WSNs in a network configuration using the IEEE 2.4 GHz 802.15.4 radio standard. Additionally, the CMU is also a member of either a train-based wireless network, which consists of the CMUs from all enabled railcars in the train consist; controlled by a manager, preferably a PWG, typically located on a powered locomotive; is a member of a railyard-based wireless network, controlled by one or more managers, preferably powered wireless gateway managers dispersed throughout the railyard; or operating independently outside of a wireless network. The train-based wireless network could be, for example, a train-based wireless mesh network. The railyard-based wireless network could be, for example, a railyard-based wireless mesh network. The CMU thus supports at least four functions: 1) to support built-in sensors, such as an accelerometer, within the CMU to monitor specific attributes of the railcar such as location, speed, accelerations and more; and 2) to support bi-directional communication to the powered host or control point, such as a locomotive and/or an off-train monitoring and control center; 3) to consolidate data from built-in sensors, and/or any number of WSNs in the railcar-based wireless network and to apply logic to the data gathered to generate warning alerts to a powered host such as a locomotive or remote control center; and 4) to manage a low-power wireless network overlaid on a railcar.

The CMU may be capable of receiving data and/or alarms from one or more WSNs, or generating data and/or alarms directly, and is capable drawing inferences from this data or alarms regarding the performance of railcar 103, and of transmitting data and alarm information to a remote receiver. The CMU is preferably a single unit that would serve as a communications link to other locations, such as a mobile base station (e.g., the locomotive 108), a land-based base station, etc., and have the capability of processing the data received. The CMU also communicates with, controls and monitors WSNs (when present) in the local railcar-based wireless h network. Preferably, the placement of the CMU on each railcar will be consistent, as the placement will be useful in making determinations of the order and orientation of railcars within a train consist, as described later.

A "phase detector" or phase comparator is a frequency mixer, analog multiplier, logic circuit or other hardware device that generates a voltage signal which represents the difference in phase between two signal inputs.

A "powered wireless gateway" ("PWG"), shown in the drawings, for example FIG. 1, as reference number 102, is preferably located either on a locomotive or deployed as part of a railyard-based wireless network. It typically will include a processor, a global navigation satellite system ("GNSS") receiver, a satellite and or cellular communication system, an Ethernet port, local wireless transceiver (e.g. WiFi), and a high capacity network manager or other means of communication. The PWG acts as the manager of a wireless network overlaid on a train consist (a train-based wireless network, as define below), consisting of multiple CMUs from each railcar in a train consist, or is a member of a wireless network overlaid on a railyard (a railyard-based network, as defined below), consisting of other PWGs and CMUs from individual railcars not currently associated with a train consist. PWGs can communicate and manage WSNs directly, without requiring the presence of a CMU. The PWG, if located on a powered asset, such as a locomotive 108, will derive power from the powered asset, or will derive its power from another source, for example, from a solar power generator or from a high capacity power source, such as a battery.

Figure 9:
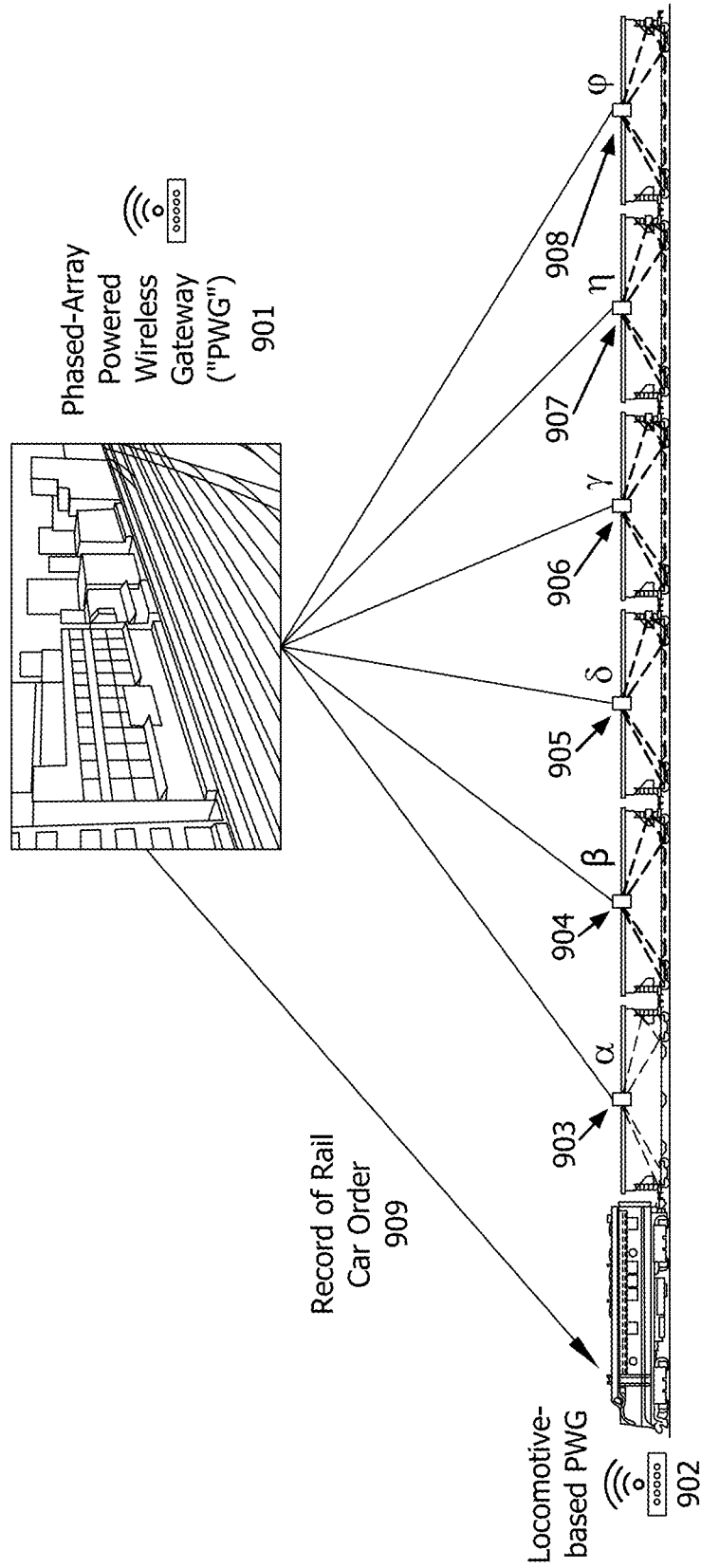
FIG. 9 is a diagram illustrating an embodiment for detecting monitored railcars in a railyard.

A "phased-array PWG," shown in the drawings, for example FIG. 9 as reference numeral 901, is preferably deployed as part of a railyard-based wireless network is a PWG equipped with a phased array and other components that enable angle-of-arrival functionality. It typically will include a processor, a global navigation satellite system ("GNSS") receiver, a satellite and or cellular communication system, an Ethernet port, local wireless transceiver (e.g. WiFi), and a high capacity network manager or other means of communication. The phased array PWG may include many of the same features described above with regard to a PWG. In addition to the components and features described above, the phased array PWG may include a number of phased array antennas, phase shifters, a power combiner/splitter, a phase controller, and a phase detector. The information gathered from the phased array may be used to determine a train consist order or track location of a railcar or train consist.

The PWG or phased-array PWG collects data and draws inferences regarding the performance of the train consist, as opposed to CMUs, which draw inferences regarding the performance of individual railcars.

A "dark railcar" is a railcar equipped with a CMU but which is not connected or associated with a train-based wireless network or a railyard-based wireless network, as defined below.

A "railcar-based wireless network" shown in the drawings, for example FIG. 1, as reference number 105, consists of a CMU on a railcar 103, which is part of and manages a network of a plurality of WSNs, each deployed, preferably, on the same railcar 103. A railcar-based wireless network could be, for example, a railcar-based wireless mesh network.

A "train-based wireless network," shown in the drawings, for example FIG. 1, as reference number 107, consists of a powered PWG 102 typically located on a locomotive 108 (but which may be on any moving asset in the train consist), which is part of and manages a network of a plurality of CMUs, such as for example, a mesh network, each deployed on a railcar, wherein the locomotive and plurality of railcars form a train consist. A train-based wireless network could be, for example, a train-based wireless mesh network.

A "railyard-based wireless network," shown in the drawings, for example FIG. 1, as reference number 117, consists of one or more land-based, powered PWGs deployed at strategic locations in a railyard. A railyard-based wireless network, could be, for example, a railyard-based wireless mesh network. The PWGs form a network which includes one or more CMUs, each deployed on a railcar, and one or more mobile PWGs, each deployed on a powered asset, such as a locomotive, and may optionally include one or more WSNs located on railcars. In an embodiment, individual WSNs located on railcars may directly join the railyard-based (or train-based) network, bypassing the CMU on the railcar, by directly communicating with the PWGs located in the railyard. The locomotives and railcars in the railyard-based network are not associated with a train consist, but instead the PWGs, CMUs and, optionally, WSNs located on the railcar are nodes in the railyard-based network.

Building off of the IEC 62591 international wireless standard as well as the ISA100.11, a standard from the International Society of Automation, the railyard- and train-based wireless network architectures are developed to these standards.

A "managed railyard" is defined as a railyard having a railyard-based network overlaid thereon.

A "monitored railcar" is defined as a railcar having a CMU or a railcar with a railcar-based network consisting of a CMU and one or more WSNs.

The discussion which follows describes the system in the context of a railcar, however, it will be understood by one of skill in the art that the same methods are applicable to any railroad vehicle or asset. It should also be noted that the definitions above are not meant to be exclusive, in that defined components may have additional components or features not included in the definition. Furthermore, while the description which follows features a railcar with two trucks (or bogies), it is applicable to any configuration with more or less trucks or axles.

DETAILED DESCRIPTION OF THE INVENTION

It is desirable to provide a train consist management system in a railyard to ease the management of creating and validating train consists. It is intended to eliminate mistakes and to mitigate the safety risks to humans carrying out the manual process of the current systems. Additionally, automating the process improves the efficiency of the management of the railyard, thereby reducing costs.

Given the demanding and harsh environments in which railroad trains operate, any monitoring system must be rugged, reliable and able to operate for long periods with little or no maintenance. Because there are more than 1.5 million freight railcars in North America alone, and many millions more around the world, a system of monitoring all railcars, both in use and idle in a railyard, is highly desirable and, as such, the system needs to be scalable to handle a very large number of potential devices.

Various existing systems include determination of train consist ordering by intelligent use of the correlation of timing measurements from a combination of on-board sensors, e.g. wireless sensor nodes ("WSNs"), and or the radio communications of the on-board communication management unit ("CMU"), coordinated through a locomotive-based PWG in communication with a phased array PWG. These systems require modifications to intra-train communication systems, software enhancements, and other resource intensive adjustments to existing intra-train systems.

It is an object of the present invention to provide a train consist management system, where a railyard-based network is overlaid on a railyard, and which includes one or more powered wireless gateways ("PWGs") present in the railyard which act as communication points and aggregators of data generated and transmitted by the networks of each railcar in the railyard. In addition, the PWGs in the railyard manage train consists and perform analysis of data from multiple monitored railcars and systems. When a railcar is not within a managed railyard, the same data transmission and analysis can be performed in the presence of a PWG installed on a locomotive or other moving asset within the train consist or a CMU installed on a railcar.

The present invention preferably operates in an environment of a managed railyard, having a topology as shown in FIG. 1. Railcar 103 (shown as both 103(a) and 103(c) in FIG. 1) is typically equipped with multiple WSNs 104 placed at various positions on railcar 103. The positioning of individual WSNs 104 is dependent on the operational parameter(s) of the railcar 103 that are being monitored. CMU 101 is positioned on railcar 103 and forms a railcar-based network 105, which for example, could be a railcar-based mesh network being managed by CMU 101 and having the WSNs 104 as nodes in the network. Preferably, CMUs 101 will be positioned and oriented in a consistent manner on each railcar 103. Also preferably, CMU 101 will be positioned toward one end of railcar 103 so as to be useful in determining the orientation of the railcar within the train consist and at any location within the railyard. Optionally, railcar 103 may have only a CMU 101, and no WSNs 104, shown as 103(b) in FIG. 1 in which case there will be no railcar-based network associated with that railcar.

Locomotive 108 is equipped with a PWG 102. PWG 102 also controls a train-based wireless network 107 which is managed by PWG 102 and has CMUs 101 on each railcar in the train as nodes.

A railcar 103(d) not having a CMU 101 or WSNs 104 is considered an unmanaged railcar and is outside or otherwise not part of the train-based network 107.

Figure 2:
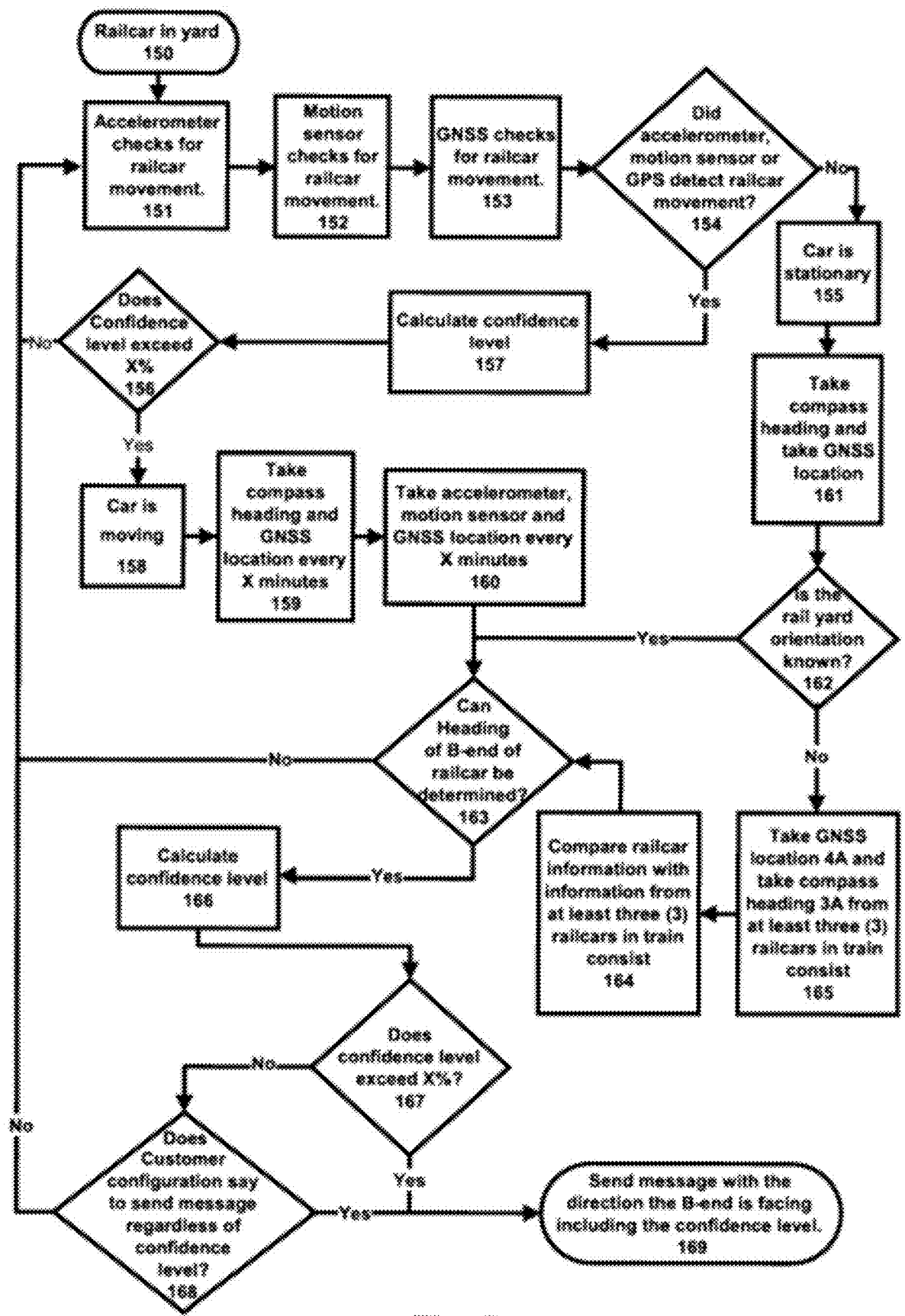
FIG. 2 is a flowchart illustrating a method of determining the location and orientation of a railcar in a railyard.
Figure 3:
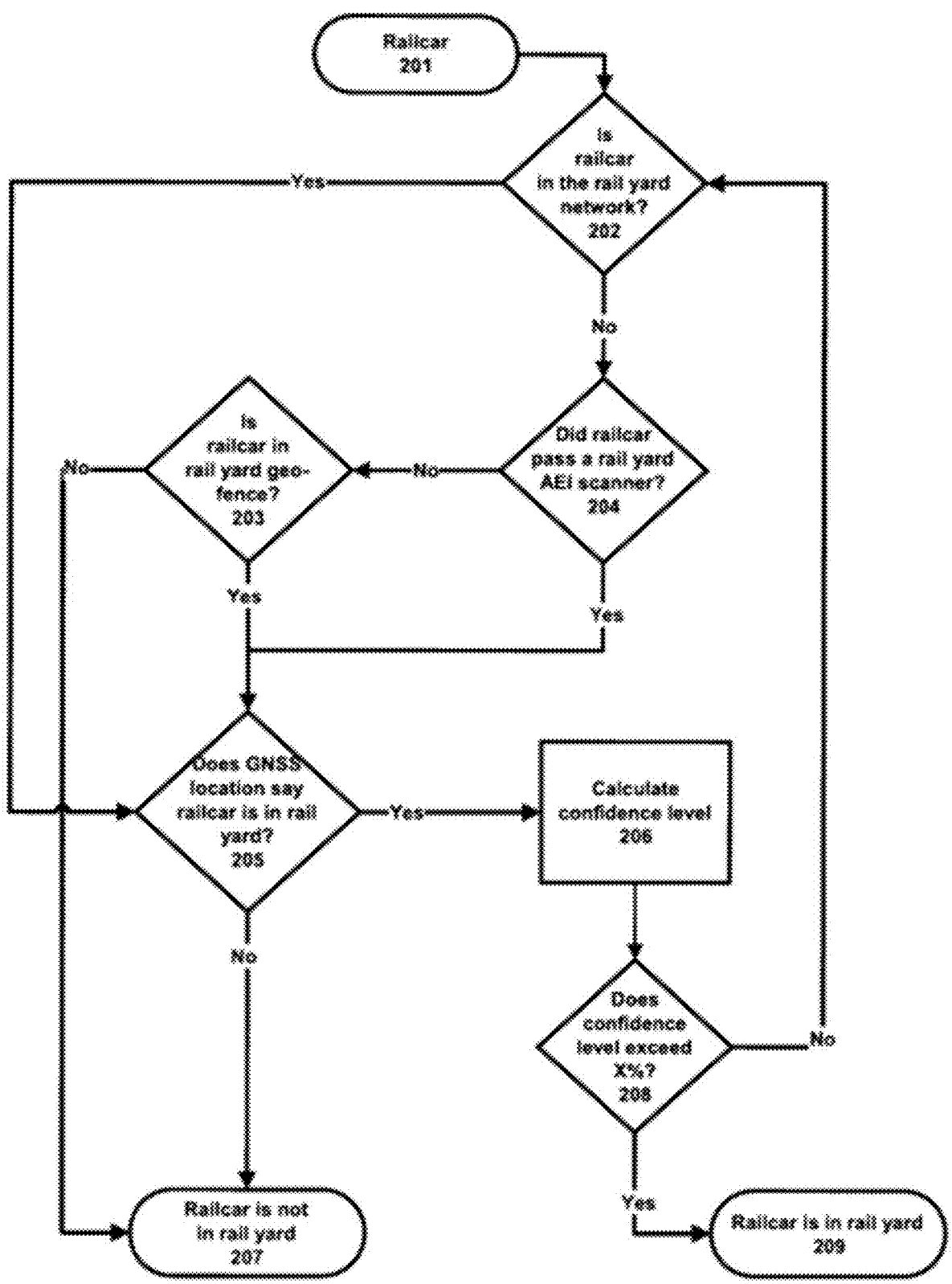
FIG. 3 is a flowchart illustrating a method of determining whether a railcar is in a railyard.

The present invention also relates to a method of monitoring a railyard wherein, the location and orientation of the railcar within the railyard is determined by the method shown in FIG. 2, the presence of a railcar 103(a) or 103(b) within the railyard is determined by the method shown in FIG. 3, and the building of a train consist proceeds as shown in FIG. 4.

The order of a railcar in the train consist, the orientation of the railcars and/or the location of the railcar in the railyard may be determined via several methods, discussed below. The orientation of a railcar in the train consist is a critical element in the train consist. As is known in the industry, the ends of a railcar are identified as either "A" or "B". Readings from a magnetometer or electronic compass and an accelerometer can be used to identify the orientation of the railcar. Additionally, orientation may be determined from the placement of system components on the railcar.

FIG. 2 is a flowchart showing the method of determining the location and orientation of a railcar within a railyard. In the method shown in FIG. 2, for example, makes the following assumptions:

CMUs may be installed in a known location and with a known orientation on each railcar.

There may be one or more railcars 103 each with a CMU in the railyard.

The boundaries and orientation of the railyard with respect to magnetic North may be represented by geo-fences and historical data.

Time-stamps may be associated with all sensor events.

The orientation of a railcar in a known railyard may be used rather than the position of a device with a compass that is installed on a railcar.

The method starts with the assumption at 150 that the railcar is in the railyard. At 151, 152 and 153 it is determined whether or not the railcar is moving through use of an accelerometer, a motion sensor and/or a GNSS respectively.

At decision point 154, if motion was detected control proceeds to 157 where a confidence level is calculated and, at decision point 156, it is determined if the calculated confidence level exceeds the required threshold. The confidence level calculated at 157 is the likelihood that the railcar is actually moving. If, at decision point 156 the threshold is not met or exceeded, control proceeds back to the beginning of the method where various sensors are checked for movement. If it is determined that the railcar is in motion, at 158 a compass heading and GNSS location are periodically obtained at 159 and at 160. Readings from the accelerometer and motion sensor are also periodically obtained. At decision point 163 it is determined if the heading of the B-end of the railcar can be determined. If it can, a confidence level is calculated at 166 and, at decision point 167 it is determined if the confidence level exceeds the required threshold. If the threshold is exceeded, a message is sent with a direction the B-end the railcar is facing including the confidence level at 169. If the confidence level does not exceed the threshold at decision point 167, then control returns to the beginning of the method where movement is detected at 151, 152 and 153. At decision point 168, the user may optionally configure the system to send the message regardless of the confidence level, in which case the message is sent at 169.

If, at decision point 154 it is determined that no motion was sensed, the railcar is declared as being stationary at 155 and a compass heading and GNSS location are obtained at 161. At decision point 162 it is determined if the orientation of the railyard is known. If it is unknown, control proceeds to 165 where the GNSS location and compass headings from at least 3 railcars in the train consist are obtained. At 164, the compass heading and GNSS location from the railcar in question is compared to the readings obtained at 165 from at least three other railcars. At decision point 163 it is determined whether or not the heading of the B-end of the railcar can be determined, and, if not, control proceeds as described above. At decision point 162, if the orientation of the railcar is not known, then control proceeds directly to decision point 163 and thereafter proceeds as above.

FIG. 3 is a flow chart showing a method of determining whether or not a railcar is inside of a railyard. In this case, the method assumes that the railyard is a managed railyard. The method starts at 201 with the railcar. At decision point 202 it is determined if the railcar is a member of the railyard-based wireless network 117. If it is, control proceeds to decision point 205 where it is determined whether or not the location of the railcar as reported by GNSS is consistent with the railcar being in the railyard. If it is, a confidence level that the railcar is actually in the railyard is calculated at 206.

At decision point 208, it is determined if the confidence level exceeds the required threshold for making a determination that the railcar is within the railyard. If the threshold is exceeded, control proceeds to 209 where it is determined that the railcar is in the railyard. If the confidence level is not exceeded, control returns back to decision point 202.

If, at decision point 205, the location of the railcar as reported by GNSS is not consistent with the railcar being in the railyard, control proceeds to 207 and the conclusion is drawn that the railcar is not in the railyard.

If the railcar is not a member of the railyard-based wireless network 117, control proceeds to decision point 204, where it is determined if the railcar passed an automatic equipment identification ("AEI") scanner. If the railcar has passed an AEI scanner, control proceeds to decision point 205 and proceeds as above. If, at decision point 204 the railcar has not passed an AEI scanner, it is determined at decision point 203 if the railcar is within a geo-fence defining the boundaries of the railyard. If it is determined that the railcar is within the railyard's defined geo-fence, control proceeds to decision point 205 and proceeds as described above. If, at decision point 203 it is determined that the railcar is external to the railyard's defined geo-fence, it is determined that the railcar is not in the railyard at 207.

A collection of links creates a train consist as referenced in FIG. 4. A train consist is built one link at a time. The linking of railcars and links of railcars is a critical part of this process and can be determined by one or more methods, which can be used stand-alone or in combination to provide a level of probability that two or more railcars are linked, or that two or more links of railcars are linked. The confidence level of the order of the railcars in a train consist is increased if more than one method is used. The sensor readings and process results are associated to an asset, a component of the asset, a phenomenon, and time. The information is stored so that analysis can be performed on both real-time and historical datasets.

FIG. 4 shows the formation of a train consist built of links of railcars. In FIG. 4(a), railcar B impacts railcar A and forms link 401. Likewise, railcar D impacts railcar C and forms link 402. In FIG. 4(b), railcar C impacts railcar B to form larger link 403 shown in FIG. 4(c). In FIG. 4(d) a single railcar E impacts railcar D to form link 404, consisting of railcars A through E, shown in FIG. 4(e).

CMUs 101 primarily provide data upstream to determine the presence of railcars in a railyard, the location and orientation of railcars in a railyard (FIG. 2), a connecting or linking of railcars as they are prepared to be part of a train consist (FIG. 4), an order of railcars in a train consist, a validation of railcars in a train consist and a direction of travel of a train consist. Additionally, the CMU has an optional means for monitoring the output from a variety of sensors (both internal to the CMU and in WSNs which are in communication with the CMU) as well as attached directly to a railcar and determining the behavior and condition of the railcar and its various components, based on an analysis of the data. The sensors collect, store, analyze and process data, which is then transmitted to the CMU for further transmission to a PWG, where an engineer, control point or automated system can act on the data, for transmission to a remote railroad operations center, or for processing and analysis to build alerts, events or reports.

The CMU is capable of collecting data from each integrated sensor as well as from WSNs and performing higher-level analysis of the data by applying heuristics and statistical models to data, events and alerts collected from a plurality of WSNs, to determine location, speed, heading, condition and more of a railcar. During such data analysis, heuristics may be applied to determine potential linking of railcars based on statistical models and empirical data. The CMU also is capable of communicating both the data and the results of any analysis to another system remote from the railcar, such as a remote server, via any one of a number of communication protocols.

A PWG may be located, for example, on a locomotive, or in a railyard. The PWG may also be able to perform higher-level analysis of the condition of an entire train consist by applying heuristics and statistical models to data, events and alerts collected from a plurality of CMUs, located on different railcars in the train. The analysis of the data collected can be carried out at any one of a plurality of different event engines distributed among the various components in the present invention, including the WSNs, CMU, train-based or land-based PWGs, or other land-based stations. The event engine is used to determine state changes and actions to perform on the device from a plurality of inputs internal or external of the system. The logic used to determine an outcome is based on a set of rules which can be configured and updated remotely.

The following types of methods can be used to determine the linking (or unlinking) of two or more railcars or two or more links, as shown in FIG. 4.

Motion—If an accelerometer, and or a motion sensor and or GNSS indicate motion on two or more railcars, the time stamps are compared to determine the likelihood that two or more railcars are linked.

Speed and Heading—When two or more railcars are traveling at the same speed and on the same heading then they are considered linked.

Network Signal Strength—A link can be determined by comparing the signal strength across two or more railcars and comparing it to the signal strength of other railcars in the railyard-based wireless network. The signal strength is compared to known adjacent railcars, where the railcars are considered linked. The wireless network connection is established when two or more railcars each have installed a CMU 101 that has the ability to communicate with the wireless network. Each CMU 101 has a measurable signal strength where both the presence of the signal and the strength of the signal can be used to determine if two or more railcars are linked.

Impacts—An impact with time stamp is generated when two or more railcars are coupled. The time stamp across two or more railcars is compared to determine which railcars have time stamps within a specific time period, which is then used to determine if the railcars are linked. Additionally, during an impact, there is a positive and negative response created, wherein the positive and negative wave profiles are compared and if they are the same or similar the railcars are considered linked.

Location—If two or more railcars have location readings within proximity to the others, it can be assumed they are linked. The confidence level of this type of linking depends upon the complexity of the railyard. Location information may be obtained from a GNSS.

Spline Curve Fit—Knowing at least three railcars in a train consist, utilize location in conjunction with spline curve fit between railcars in a string. As the train consist is assembled, a best fit curve can be applied to the railcars currently in the train consist. Best fit curve must be within constraints of railroad track geometry. This curve can be used to determine if a railcar is incorrectly marked as not within the train consist, based on location position and proximity to the spline.

Compass Heading—Knowing at least three railcars in a train consist, utilize location in conjunction with angle of compass heading between adjacent railcars—As the train consist is assembled, angle variation between adjacent railcars can be used to determine potential linked railcars. Angle must be within constraints of railroad track geometry. The difference in angle between railcars can be used to determine if a railcar is incorrectly marked as not within the train consist, based on location position and angle values that match other adjacent railcars within the same known train consist.

Brake Events—During a braking event, a pressure change occurs to modify the braking state on each railcar. This event of a pressure change will be perceived by each connected railcar in series from the locomotive to the last connected railcar. The time of this event is used to determine connected railcar order in the train consist.

One example of this would be the brake test. A brake test must occur before a train consist can leave a railyard. In this case, brake lines in connected railcars will be pressurized to a standard pressure. This ensures the brakes are released. During a brake test, a sudden drop in pressure occurs to actuate the brakes on each railcar. This event of a sudden pressure drop will be perceived by each connected railcar in series from the locomotive to the last connected railcar. The time of this event is used to determine connected railcar order in the train consist.

AEI Tags—If two or more railcars are scanned by the same AEI (Automatic Equipment Identification) reader, use the time of the scan, the time difference or offset between the scan of each railcar and the speed of each railcar to determine if the railcars are linked.

When an "event" occurs, either asynchronously triggered by external phenomenon (e.g. motion starts) or on a timed basis, the event is recorded and transmitted to a CMU and or PWG within the railyard-based network or train-based network in the train consist. The sensors are installed on different components of an asset, recording the asset, time, and details of the event. Some examples of sensors and methods are listed below (but not limited to):

Asset impact—measured in g-force

Railcar coupler impact—measured in g-force (this is a more specific form of asset impact)

Asset GNSS location—latitude and longitude

Asset speed and heading—measured in mph & direction of travel in degrees

Brake line pressure change—measured in psi

Asset AEI tag scan—presence of scan (true/false)

Figure 5:
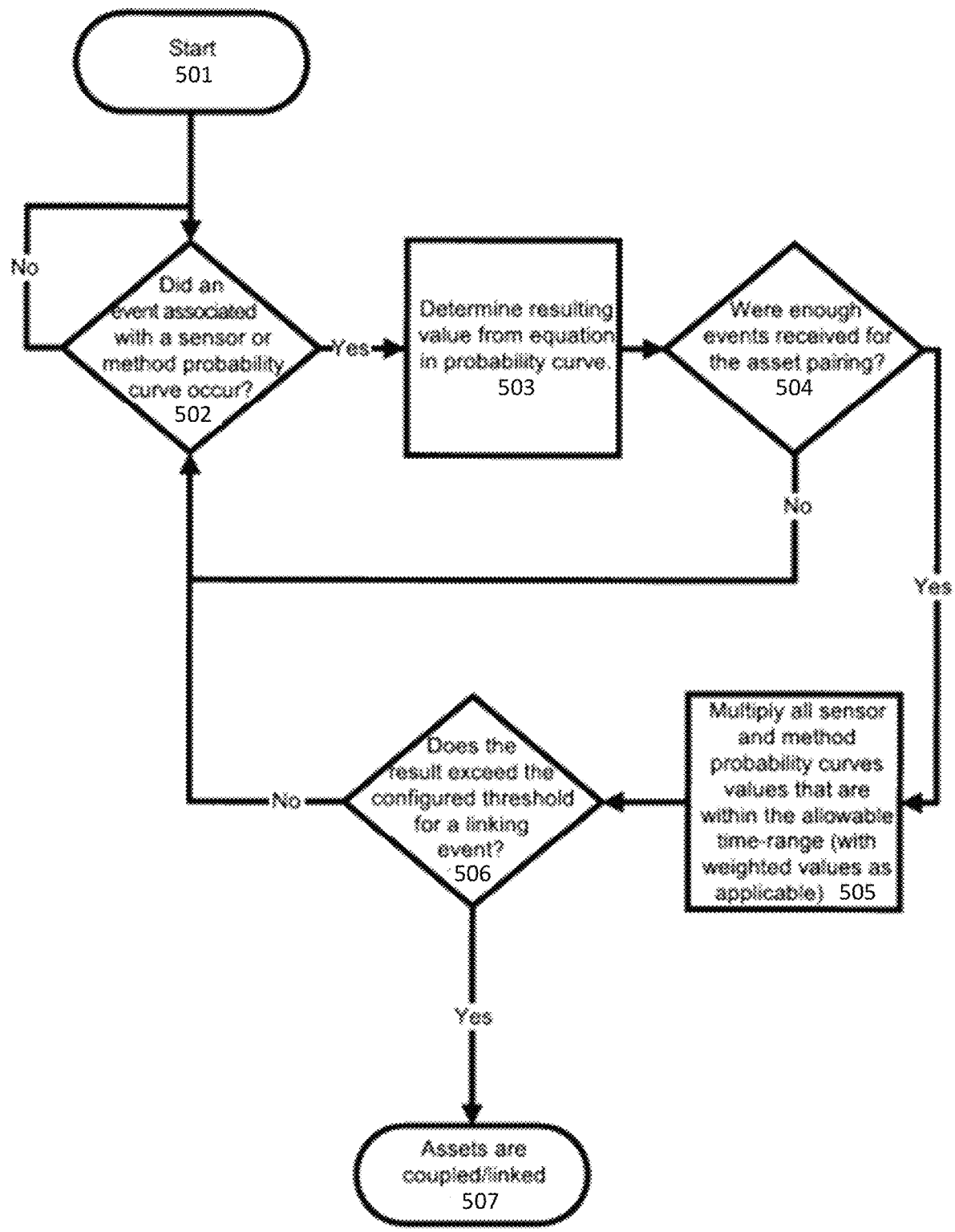
FIG. 5 is a flow chart showing the process for determining if a coupling event has occurred.

FIG. 5 is a flowchart showing the process for verifying whether two or more railcars have been coupled, or whether two or more links have been coupled. The process starts at 501 and, at decision point 502, it is determined if an event has occurred for which a probability curve exists (i.e., an event that may be relevant in determining coupling). If not, control returns back to decision point 502. If an event of interest was received, the value of the probability for that event is retrieved from the relevant probability curve at 503. At decision point 504, it is decided if enough events have occurred such that a coupling can be evaluated. If not, control returns to the decision point 502. If enough events have occurred, the probabilities from the probability curves for each of the events are retrieved at 506 and multiplied together to create an overall probability. At decision point 505 it is determined if the overall probability exceeds the predetermined threshold necessary to declare that a coupling has positively occurred. If not, control returns to decision point 502. If so, then the coupling event is declared to have occurred at 508.

Figure 6:
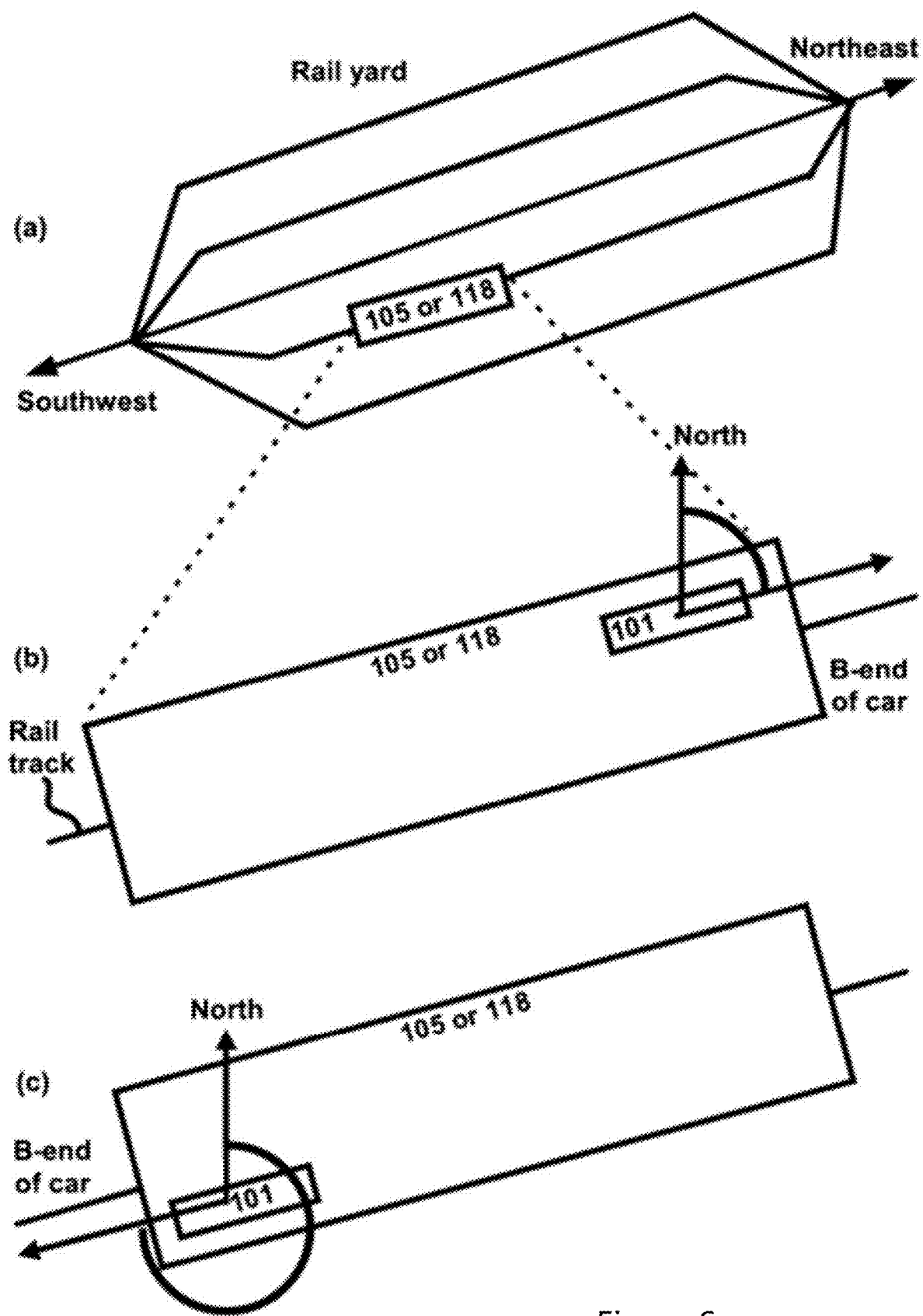
FIG. 6 is a diagram illustrating a railyard in which the direction of the railyard is known to be running southwest to northeast with enlargement of railcar showing how the B-end of a railcar with CMU installed thereon can be determined based on the heading of the CMU compared to North.

FIG. 6 shows the method whereby the orientation of a railcar within a railyard is determined utilizing the on-board compass. This is a method that is performed in at 161, 159 and 165 of FIG. 2. This method makes several assumptions. First, the orientation of the railcar can be determined by a assuming that the CMU is installed in a known place and orientation on the railcar. It is also assumed that the orientation of the tracks within the railyard with respect to North are known, as shown in FIG. 6(a).

If the asset is in motion, the orientation of the railcar can be determined by comparing the changes in compass heading, or the lack thereof, over time parallel to the direction of travel as determined by the GNSS location updates. If the vector of the compass matches the vector created by the difference between two or more GNSS points, then the railcar is moving towards the B-end (if the CMU is installed/ oriented in that way). This is shown in FIG. 6(b). If the vectors are opposite, then the railcar is moving towards the A-end. This is shown in FIG. 6(c). In both FIGS. 6(b) and 6(c) the direction of travel is toward the right or toward the northeast as indicated on FIG. 6(a).

If the asset is stationary, the compass and location can be used to compare to a known railyard layout and orientation stored within the system as shown at 162 of FIG. 2. The compass orientation and GNSS location will be used to compare against the railyard location and orientation to determine the railcar heading. If the asset is stationary and the railyard location is not known, then the orientation of a railcar in question can be compared with other assets in a known group of linked railcars. This is shown at 165 of FIG. 2.

Because the rail track can curve only at a small and defined rate, if three or more railcars are known to be linked, the variation in compass heading is small (when accounting for the 180 degree difference if facing opposite directions). If the asset in question is in close proximity to the railcars used for the baseline, or linked as part of the same train consist, a compass reading of the asset can be compared to the other assets to determine heading. As with other methods discussed herein, a confidence level can be assigned to the result, as shown at 166 and 167 of FIG. 2.

In another embodiment, the order of a train consist may be derived by using angle-of-arrival (AoA) technology in the manager gateway receiver to detect the direction of propagation of electromagnetic radiation from railcar CMU devices upon arrival at a phased array PWG receiver. This information can be used to determine the order of railcars in train consists. The same AoA technology may be able to be used to manage railcar order across a fleet of consists in a designated freight yard.

Figure 7:
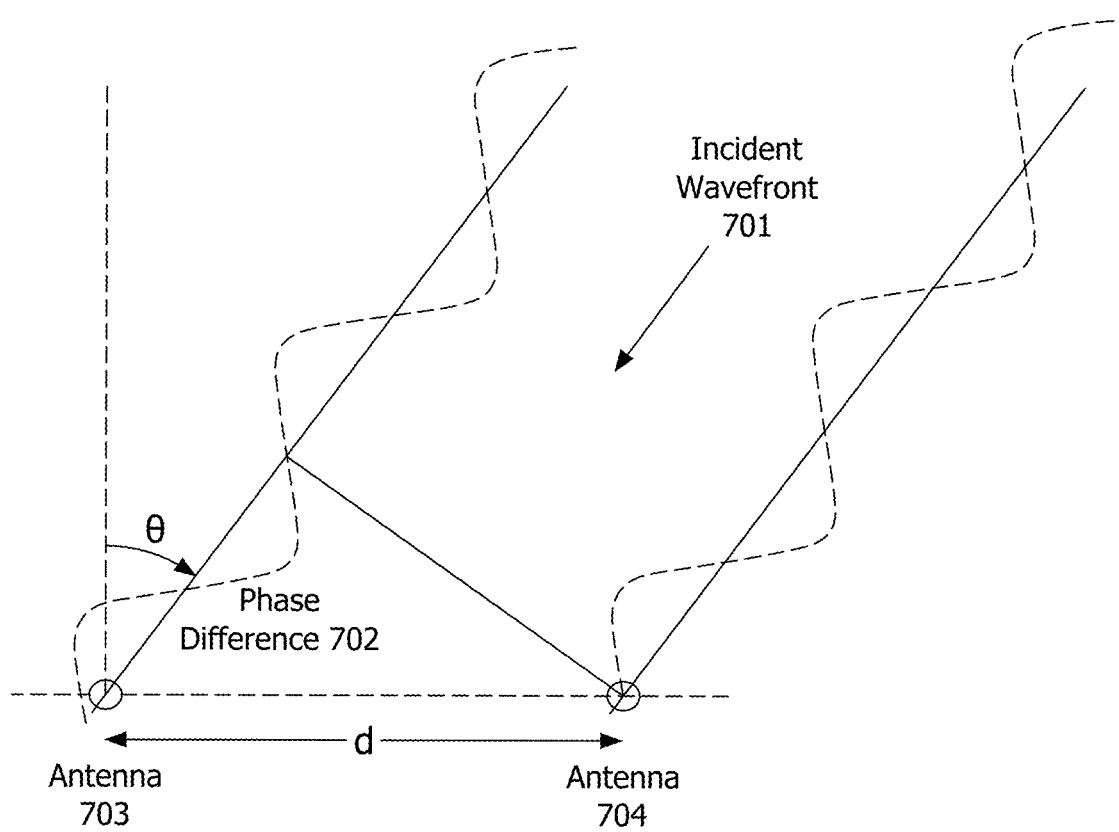
FIG. 7 is a diagram illustrating time distance to arrival.
Figure 8:
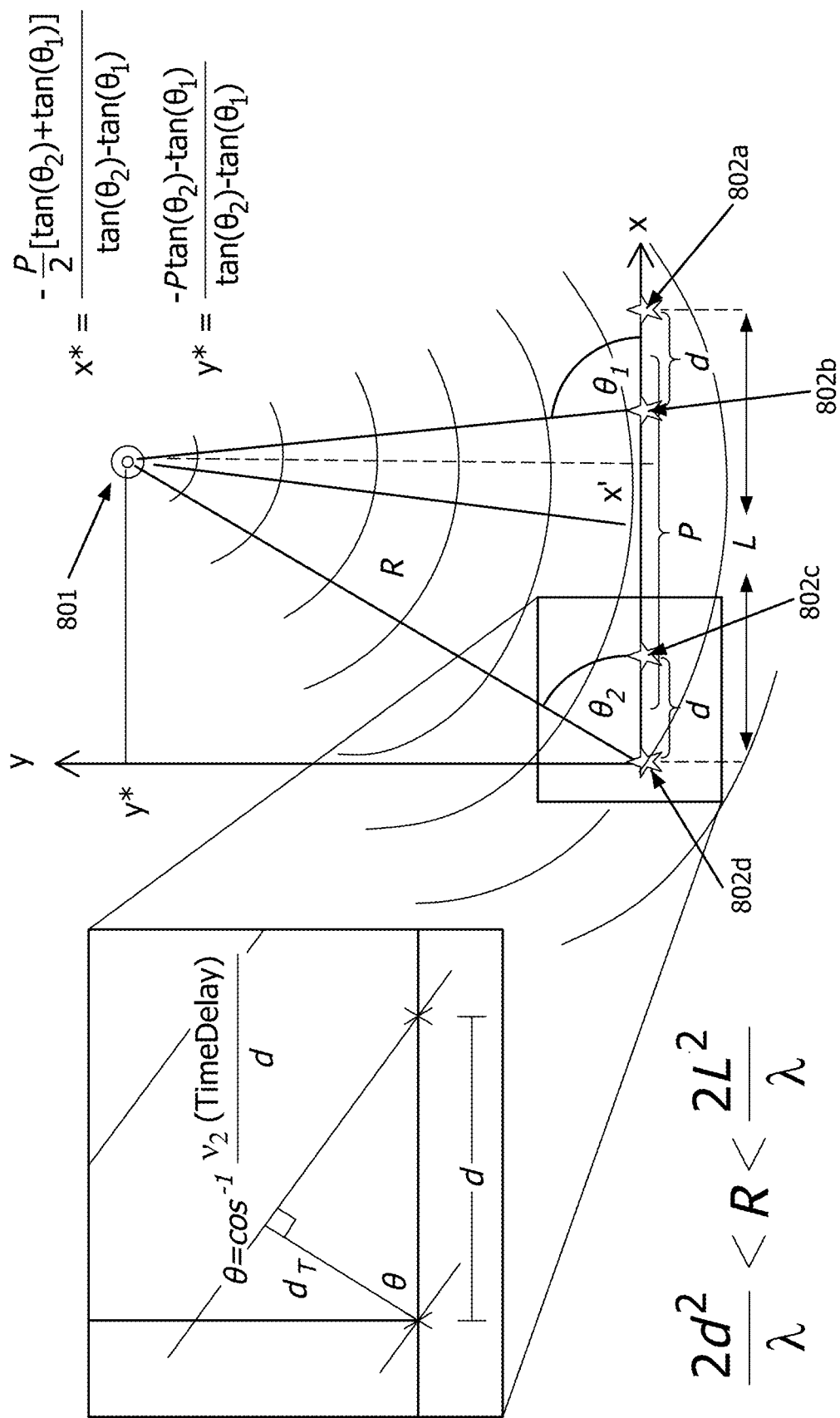
FIG. 8 is a diagram illustrating geometric relationships used to calculate angle of arrival.

The AoA signal collection technique is traditionally a measurement method for determining the direction of propagation of a radio-frequency wave incident on an antenna array. The AoA Method determines the direction of the incident propagating signal by measuring the Time Difference of Arrival ("TDOA") in coordination with processing of the vector signal parameters at individual elements of the array as shown in FIG. 7. The measurement is made by measuring the difference 702 in received phase at each element, Antenna 703 and Antenna 704 in the antenna array. In this example, an incident electromagnetic wavefront 701 is traveling at an angle $\theta$ from some arbitrary relative position. This could be a compass direction, for example. Since the distance d between Antenna 703 and Antenna 704 is known and the angle $\theta$ is calculable from the characteristics of the signal itself, as shown in FIG. 8.

In the railyard scenario, the situation becomes less complex. Referring now to FIG. 8, each railcar in the linear train consist may be equipped with a communications management device ("CMU") 802b-d capable of communicating to a locomotive-based PWG 802a. This same device can also communicate with a phased array PWG 801 when in a designated railyard. In this scenario, signals transmitted from a locomotive-based PWG 802a and CMUs 802b-d is collocated at the site of a phased array PWG 801, for example, a railyard-based PWG having a phased array, simplifying the wave propagation geometry calculation to a single signal collection point (e.g., phased array PWG 801) as seen from the perspective of the locomotive-based PWG 802a and/or individual railcar CMUs 802b-d in the linear train consist. For ease of description, the phased array PWG 801 is represented as a point source and locomotive-based PWG 802a and/or CMUs 802b-d are represented as point arrays. This is justified given that the phased array PWG 801 is, for example, fixed relative to the railyard and the locomotive-based PWG 802a and/or CMUs b-d are fixed relative to the train consist. Given known variables of d, P, and $\theta$, or $\theta_1$ and $\theta_2$ (derivable from the characteristics of the signal itself using the equations listed below), the distance between the phased array PWG 801 and locomotive-based PWG 802a and/or CMUs 802b-d can be calculated and the above methods can be employed to determine railcar order. As shown in FIG. 8, the following variables are defined:

d is the distance between two transmission points, i.e. locomotive-based PWG 802a and/or CMUs 802b-d.

$\theta_1$ is the angle between the direction of travel of the railcar including CMU 802b and the direction of the PWG 801 relative to the CMU 802b.

$\theta_2$ is the angle between the direction of travel of the railcar including CMU 802*b* and the direction of the PWG 801 relative to the CMU 802*d*.

R is the distance between locomotive-based PWG 802*a* and/or CMUs 802*b-d* and PWG 801.

P is the distance between the center of 802*a*-802*b* and the center of 802*c*-802*d*.

L is the distance between locomotive-based PWG 802*a* and CMU 802*d*.

$$\theta = \cos^{-1} \frac{v_2(\text{TimeDelay})}{d} \quad \text{(Equation 1)}$$

$$\frac{2d^2}{\lambda} < R < \frac{2L^2}{\lambda} \quad \text{(Equation 2)}$$

$$x^* = \frac{-\frac{P}{2}[\tan(\theta_2) + \tan(\theta_1)]}{\tan(\theta_2) - \tan(\theta_1)} \quad \text{(Equation 3)}$$

$$y^* = \frac{-P\tan(\theta_2)\tan(\theta_1)}{\tan(\theta_2) - \tan(\theta_1)} \quad \text{(Equation 4)}$$

Figure 14:
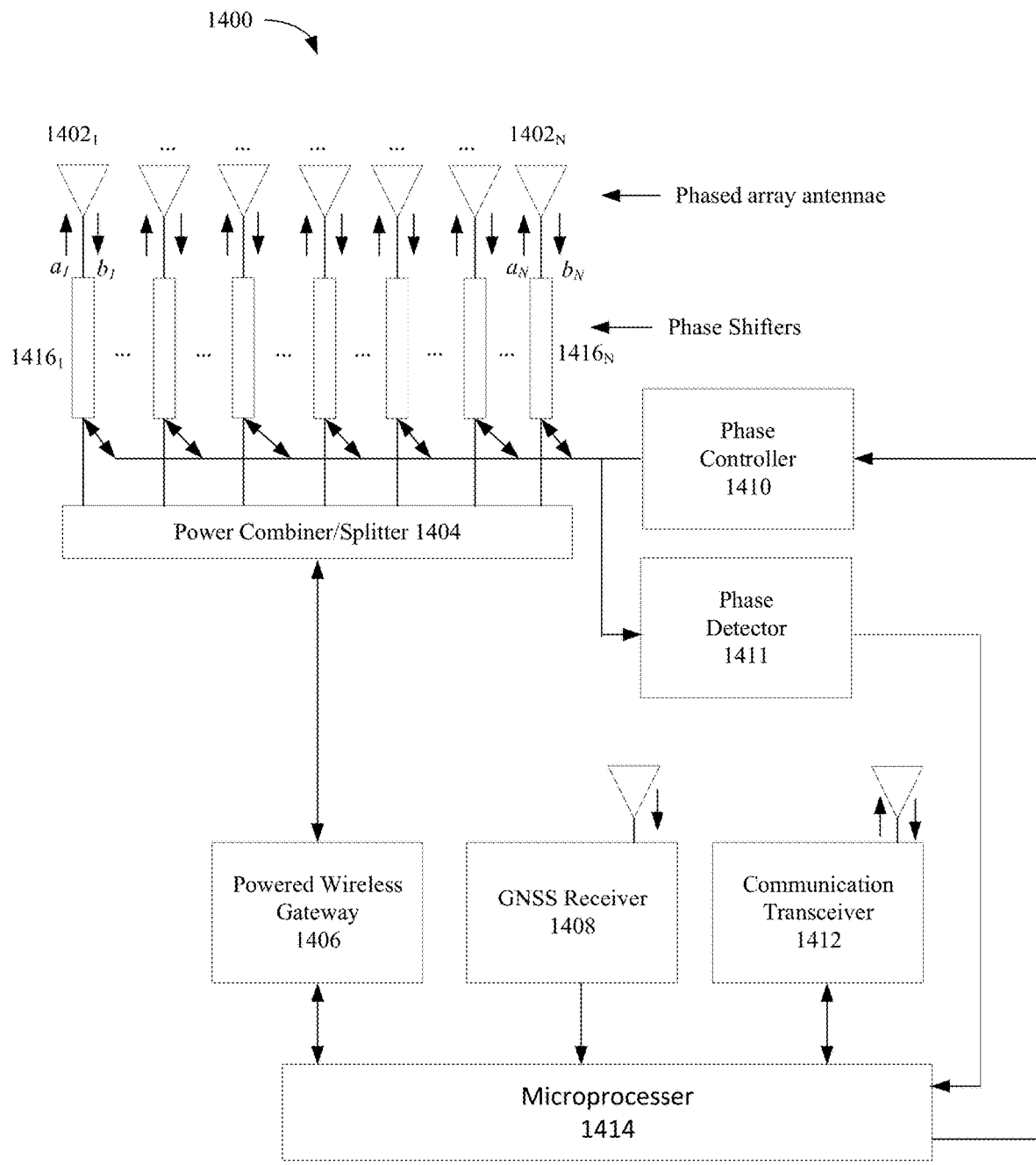
FIG. 14 is a diagram of a detection circuit in the phased array PWG receiver.

The example structure shown in FIG. 14 shows a phased array PWG 1400 employing a general phased array front end structure. Phased array PWG 1400 includes an array of antenna elements 1402₁ to 1402$_N$ each feeding a distinct phase shift element 1416₁ to 1416$_N$ and collectively feeding received signal energy to (or being fed by transmit signal energy from) power combiner/splitter 1404 and to phase detector 1411. Power combiner/splitter 1404 is connected to a PWG 1406 operating as the radio transceiver for communication with railcar and locomotives in the railyard. PWG 1406 is connected to or includes a microprocessor 1414. Also connected to microprocessor 1414 and/or included in PWG 1406 is GNSS receiver 1408 for reference location and timestamp data and communication transceiver 1412 for wireless data transmission to a backend host database. Microprocessor 1414 processes all received data from and transmitted data to PWG 1406, GNSS receiver 1408, and/or phase detector 1411. Phase controller 1410 and phase detector 1411 are controlled by microprocessor 1414 and connected to phase shifters 1416₁ to 1416$_N$. Phase Detector 1411 employs a phase and time differential detection circuit that extracts the vector information of incident radio signals from the intra-train CMU on each railcar in the identified train consist. The measured deltas in phase angles and time intervals at the antenna array elements are used by microprocessor 1414 to compute the location of the transmitting CMU and associated railcar. Conversely, phase controller 1410 adjusts the phase of each phase shift element for phase alignment and time delay control as directed by microprocessor 1414 during transmitting to ensure that a coherently combined signal is transmitted to the railcar CMUs and/or locomotive-based PWGs.

Referring now to FIG. 9, a more concrete example is shown regarding the use of the angle of arrival of the incident signals from the individual railcar CMU devices 903-908 at the phased array PWG 901. The AoA can be calculated, as described above and in FIGS. 7 and 8, and compared by the phased array PWG 901, and then used to determine the railcar location in space and time and the order of the train consist in either ascending or descending order as needed.

Figure 10:
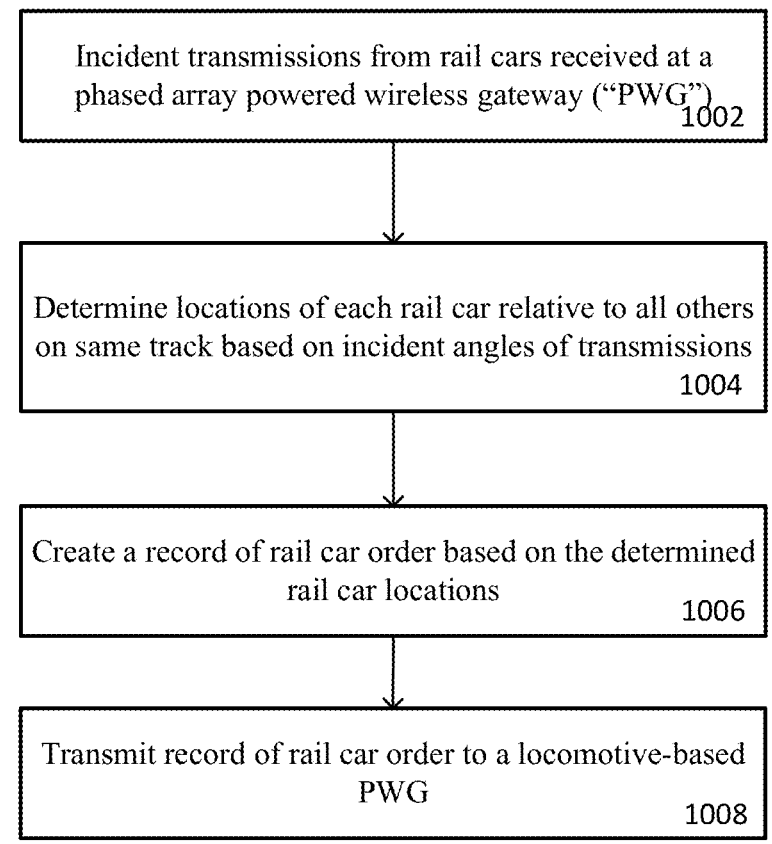
FIG. 10 is a flow chart illustrating a method of using angle of arrival to determine railcar order.

Referring now to FIG. 10, an example AoA process 1000 is shown that is performed, for example by phased array PWG 901. In step 1002, incident CMU transmissions from railcars in the train consist are received at the phased array PWG, for example phased array PWG 901 of FIG. 9. In step 1004, the incident angles (angles α-φ in FIG. 9) from each railcar location are then used to determine the location of each railcar relative to all others on the same track. The incident angles are compared to an established phase and time reference and to one another. Comparative measurements of all incident radio signal are used to establish railcar position in the train consist and the train consist ordering.

In step 1006, the phased array PWG develops a record of railcar order from this analysis of incident angles and, in step 1008, transmits the record of railcar order to a locomotive-based PWG. The records of the order of railcars in the train consist is communicated from the phased array PWG to the respective locomotive-based PWGs. The record can be used to verify the train consist order in the same railyard by communicating with the current phased array PWG or upon entering a different railyard by communicating with the new phased array PWG.

Note that the locomotive (and, for example, locomotive-based PWG 902) do not need to be present to determine the train consist ordering. The phased array PWG 901 can communicate the specific train consist order 909 to each locomotive-based PWG 902 when it becomes available.

Figure 11:
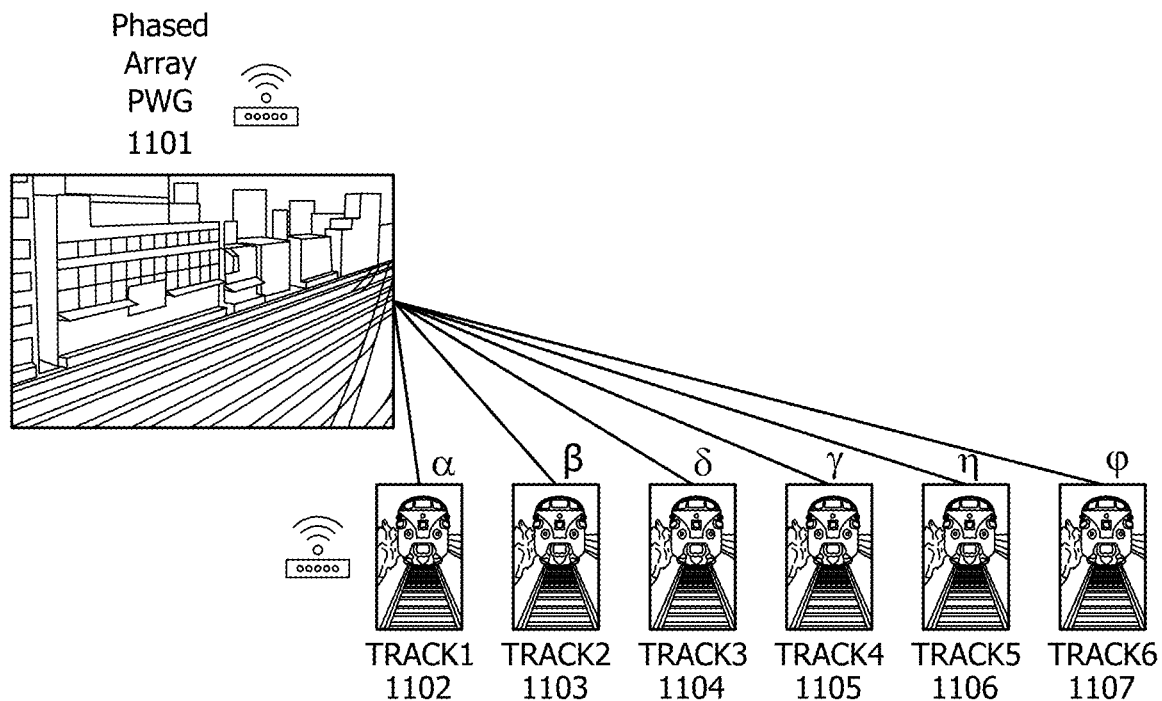
FIG. 11 is a diagram illustrating an embodiment for detecting monitored railcars in a railyard.

Recognizing that the spectral emission pattern from the transmitting sources and receiving collector is a three dimensional spatial emission, the same AoA technique used to assess the breadth of a train consist and determine railcar order, can be used to assess the depth of a railyard to manage railcar ordering across many tracks and through many train consists. Referring to FIG. 11, phased array PWG 1101 is in communication with locomotive-based PWG 1102-1107.

Figure 12:
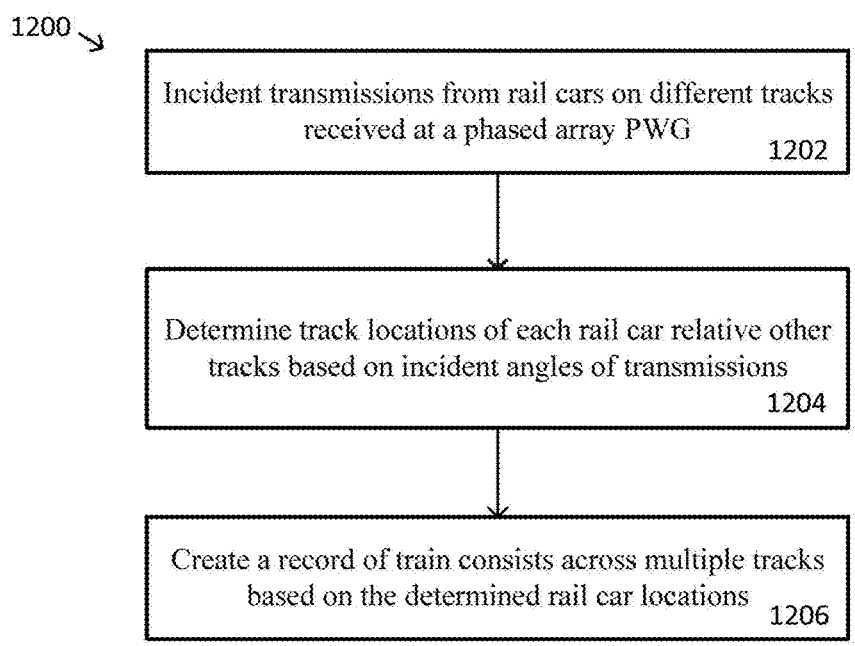
FIG. 12 is a flow chart illustrating a method of using angle of arrival to determine track locations of railcars in train consists.
Figure 13:
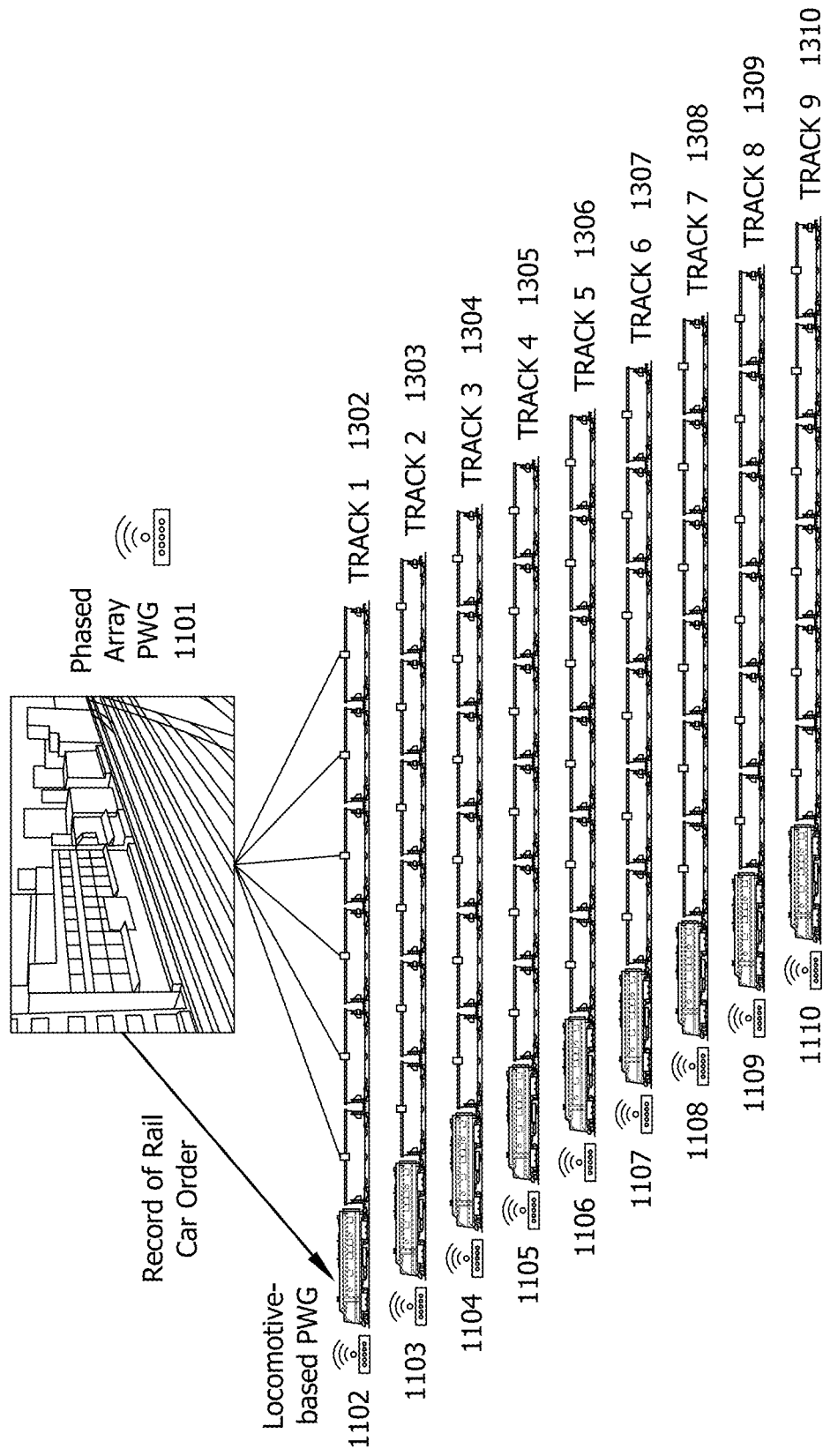
FIG. 13 is a diagram illustrating an embodiment for detecting monitored railcars in a railyard.

The same technique as described above with regard to FIGS. 9 and 10 can be used to coordinate railcars in the railyard that need to move from their present position in a train consist on one track to a new position in another train consist on a different track as shown in FIG. 11. Referring now to FIG. 12, a method 1200 is shown. In step 1202, incident CMU transmissions to the phased array PWG are received from railcars on different tracks. In step 1204, the incident angles (angles α-φ in FIG. 11, for example) from each track location can be used to calculate on which track a particular train consist is present. In step 1206, the phased array PWG develops a record of train consists across multiple tracks. Referring to FIG. 13, and using a similar method as described above in reference to FIGS. 10 and 12, the ordering of railcars in each train consist on tracks 1-6, 1202-1207 by receiving incident CMU transmissions to the phased array PWG and determining train consist locations and railcar orders using incident angles of each transmission to develop and three-dimensional record of each railcar across multiple train consists and multiple tracks in the railyard.

Referring now to FIG. 13, a detection circuit in the phased array PWG, e.g. 801, 901, 1101, extracts the vector information of incident radio signals from the intra-train communication devices on each railcar in the identified train consist. The incident angles are compared to an established reference and to one another. Comparative measurements of all incident radio signal are used to establish railcar position in the train consist and the train consist ordering.

The record of the order of the railcars in a train consist is communicated from the phased array PWG to the locomotive-based PWG. The record can be used to verify the train consist order in the same railyard by communicating with the current phased array PWG or upon entering a different railyard by communicating with the new phased array PWG.

I claim:

1. A phased array powered wireless gateway ("PWG") device comprising:
a phased array configured to receive a plurality of received signals transmitted by two or more railcar-based communications management units ("CMUs"), and wherein each said railcar-based CMU is disposed on a respective railcar of a plurality of railcars;
a phase detector in communication with the phased array and configured to detect vector information from the plurality of received signals; and
a microprocessor that has a fixed position in a geographic area, is in communication with the phased array and the phase detector, and is configured to determine a location of each railcar-based CMU and to detect a direction of propagation of electromagnetic radiation emitted from each said railcar-based CMU, and determine an order of railcars in a train consist based on the directions of propagation which were detected.

2. The phased array PWG device of claim 1, wherein:
the phased array comprises a plurality of antenna elements and a plurality of phase shifters, wherein the plurality of antenna elements are configured to receive the plurality of received signals transmitted by the one or more railcar-based CMUs, and wherein each antenna element of the plurality of antenna elements is in communication with one of the plurality of phase shifters which separates the plurality of received signals to determine a magnitude and a phase of each of the plurality of received signals;
the phase detector comprises a phase and time differential detection circuit for detecting the vector information from the plurality of received signals; and
the phased array PWG device further comprises a global navigation satellite system ("GNSS") receiver that records reference time-stamp information,
wherein the microprocessor is in communication with the GNSS receiver and processes the magnitude and phase from the plurality of phase shifters and the vector information from the phase detector, and the time-stamp information from the GNSS receiver to compute the location of each railcar-based CMU and to detect the direction of propagation of electromagnetic radiation emitted by each said railcar-based CMU.

3. The phased array PWG device of claim 1, wherein the microprocessor determines an incident angle for each of the plurality of received signals based on the vector information.

4. The phased array PWG device of claim 3, wherein a location of each said railcar-based CMU is determined, in part, based on the incident angle for each of the plurality of received signals.

5. The phased array PWG device of claim 1, wherein the microprocessor determines an incident angle for each of the plurality of received signals based on the vector information, wherein a location of each said railcar-based CMU is determined, in part, based on the incident angle for each of the plurality of received signals, and wherein the phased array PWG device further comprises a global navigation satellite system ("GNSS") receiver, wherein the microprocessor is in communication with the GNSS receiver, and wherein:
the location of each railcar-based CMU is further determined, in part, based on location information received from the GNSS receiver.

6. The phased array PWG device of claim 4, wherein a track on which each railcar is located is determined based on the location of each said railcar-based CMU.

7. The phased array PWG device of any of claim 1, wherein the phased array PWG device comprises a global navigation satellite system ("GNSS") receiver that records reference time-stamp information, wherein the microprocessor is in communication with the GNSS receiver, and wherein:
the plurality of phase shifters separates the plurality of received signals to further determine a magnitude of each of the plurality of received signals; and
the microprocessor generates a record of train consists across multiple tracks in the railyard based on the magnitude and phase from the plurality of phase shifters, the vector information from the phase detector, and the time-stamp information from the GNSS receiver.

8. The phased array PWG device of claim 7, wherein the record is used to determine movement of railcars from a first location in a first train consist on a first track to a second location in a second train consist on a second track.

9. The phased array PWG device of claim 1, wherein the direction of propagation is detected based on a time difference of arrival of each said received signal of the plurality of received signals and vector signal parameters at each said antenna element of the plurality of antenna elements.

10. The phased array PWG device of claim 1, further comprising a data storage device in communication with the microprocessor that stores a record of the order of railcars in the train consist.

11. The phased array PWG device of claim 10, wherein the record is transmitted to a locomotive-based PWG.

12. A method of determining a relative location of a plurality of railcars by a phased array powered wireless gateway ("PWG") comprising a microprocessor, a phased array and a phase detector in communication with the phased array, the method comprising:
receiving a plurality of received signals transmitted by two or more railcar-based communications management units ("CMUs"), wherein each of the two or more railcar-based CMUs is disposed on a respective railcar of a plurality of railcars;
detecting, by the phase detector, vector information associated with the plurality of signals received from the one or more railcar-based CMUs;
determining, by the microprocessor with a fixed position in a geographic area, a direction of propagation of electromagnetic radiation emitted by each said railcar-based CMU; and
determining, by the microprocessor, a location of each railcar-based CMU and an order of railcars in a train consist based on the directions of propagation which were previously determined.

13. The method of claim 12, wherein:
the phased array comprises a plurality of antenna elements and a plurality of phase shifters;
the phase detector comprises a phase and time differential detection circuit; and
the method further comprising:
receiving the plurality of received signals at the phased array;
separating, by the plurality of phase shifters, the plurality of received signals to determine a magnitude and a phase of each received signal;
receiving, from a global navigation satellite system ("GNSS") receiver, time-stamp information;
processing, by the microprocessor, the magnitude and phase from the plurality of phase shifters, the vector information from the phase detector, and the timestamp information from the GNSS receiver to compute the location of each railcar-based CMU; and determining, based on the location of each railcar-based CMU, the order of a railcar in a train consist and a track on which each railcar is located.

14. A system for managing train consists in a railyard, comprising:

one or more locomotive based powered wireless gateways ("PWGs");

two or more railcar-based communications management units ("CMUs"); and a phased array powered wireless gateway ("PWG") device comprising:

a phased array configured to receive a plurality of received signals transmitted by two or more railcar-based communications management units ("CMUs"), and wherein each of said railcar-based CMU is disposed on a respective railcar of a plurality of railcars;

a phase detector in communication with the phased array and configured to detect vector information from the plurality of received signals; and a microprocessor that has a fixed position in a geographic area, is in communication with the phased array and the phase detector, and is configured to determine a location of each railcar-based CMU and to detect a direction of propagation of electromagnetic radiation emitted from each said railcar-based CMU and determine an order of railcars in a train consist based on the directions of propagation which were detected.

* * * * *